US011303536B2

(12) United States Patent
Patel et al.

(10) Patent No.: US 11,303,536 B2
(45) Date of Patent: *Apr. 12, 2022

(54) SIMPLIFIED CLOUD-BASED ENTERPRISE MOBILITY MANAGEMENT PROVISIONING

(71) Applicant: VMware, Inc., Palo Alto, CA (US)

(72) Inventors: Harit Patel, Atlanta, GA (US); Alan Roberts, Dunwoody, GA (US); Shrivatsh Santhanagopalan, Atlanta, GA (US); Landy Youkhana, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/793,990

(22) Filed: Feb. 18, 2020

(65) Prior Publication Data

US 2020/0186438 A1 Jun. 11, 2020

Related U.S. Application Data

(63) Continuation of application No. 15/497,250, filed on Apr. 26, 2017, now Pat. No. 10,601,675.

(51) Int. Cl.
| | |
|---|---|
| *G06F 15/173* | (2006.01) |
| *H04L 41/22* | (2022.01) |
| *H04L 67/00* | (2022.01) |
| *H04L 41/5051* | (2022.01) |
| *H04L 41/0893* | (2022.01) |
| *H04L 67/10* | (2022.01) |
| *H04L 41/50* | (2022.01) |

(52) U.S. Cl.
CPC .......... *H04L 41/22* (2013.01); *H04L 41/0893* (2013.01); *H04L 41/5051* (2013.01); *H04L 67/34* (2013.01); *H04L 41/5096* (2013.01); *H04L 67/10* (2013.01)

(58) Field of Classification Search
CPC ..... H04L 41/22; H04L 67/34; H04L 41/5051; H04L 41/0893; H04L 41/5096; H04L 67/10
USPC ........................................................ 709/226
See application file for complete search history.

(56) References Cited

U.S. PATENT DOCUMENTS

| | | | | |
|---|---|---|---|---|
| 8,799,994 | B2* | 8/2014 | Barton ................. | H04W 12/37 726/1 |
| 10,609,165 | B1* | 3/2020 | Chauhan ................. | H04L 67/22 |
| 10,785,350 | B2* | 9/2020 | Barszczak ............ | H04L 67/1097 |
| 11,005,891 | B2* | 5/2021 | Chauhan ................... | G06F 9/54 |
| 11,127,178 | B2* | 9/2021 | Straub ...................... | G06T 11/60 |
| 11,190,493 | B2* | 11/2021 | Soman ................ | H04L 63/0876 |
| 2012/0304170 | A1 | 11/2012 | Morgan | |

(Continued)

*Primary Examiner* — Quang N Nguyen
(74) *Attorney, Agent, or Firm* — Clayton, McKay & Bailey, PC (57) ABSTRACT

Systems herein allow a customer to provision an enterprise mobility management system ("EMM") in a cloud service. A provisioning server can provide a portal for the customer to input an indication of a number of computing devices that the EMM system will service. The customer can also specify an EMM application version. Based on this information, the provisioning server can determine how many servers to instantiate in the cloud service and install the appropriate EMM application. The provisioning server can also monitor the number of devices and automatically instantiate additional servers as needed.

20 Claims, 6 Drawing Sheets

(56) References Cited

U.S. PATENT DOCUMENTS

| | | | | |
|---|---|---|---|---|
| 2013/0254880 | A1* | 9/2013 | Alperovitch | G06F 21/51 |
| | | | | 726/22 |
| 2014/0040978 | A1* | 2/2014 | Barton | H04W 12/06 |
| | | | | 726/1 |
| 2014/0108793 | A1* | 4/2014 | Barton | G06F 21/6218 |
| | | | | 713/165 |
| 2015/0188777 | A1* | 7/2015 | Frost | H04L 41/18 |
| | | | | 709/223 |
| 2016/0028677 | A1* | 1/2016 | Narasimhan | H04L 67/16 |
| | | | | 709/203 |
| 2016/0080239 | A1* | 3/2016 | Buenrostro | H04L 43/10 |
| | | | | 709/224 |
| 2016/0092348 | A1* | 3/2016 | Straub | G06F 8/61 |
| | | | | 717/124 |
| 2017/0048215 | A1* | 2/2017 | Straub | H04L 63/06 |
| 2017/0070385 | A1* | 3/2017 | Seetharaman | H04L 65/1016 |
| 2017/0169208 | A1* | 6/2017 | Jantz | H04L 9/0861 |
| 2018/0049019 | A1* | 2/2018 | Haran | H04W 72/0493 |
| 2018/0248788 | A1* | 8/2018 | Tsiatsis | H04L 41/0806 |
| 2018/0276001 | A1* | 9/2018 | Roszak | G06F 9/4416 |
| 2018/0307807 | A1* | 10/2018 | Tronel | G06F 21/10 |
| 2018/0316550 | A1* | 11/2018 | Patel | H04L 41/0893 |
| 2021/0185018 | A1* | 6/2021 | Soman | H04L 63/108 |
| 2021/0311774 | A1* | 10/2021 | Wei | G06N 20/00 |

* cited by examiner

SIMPLIFIED CLOUD-BASED ENTERPRISE MOBILITY MANAGEMENT PROVISIONING

This application is a continuation of and claims the benefit of U.S. patent application Ser. No. 15/497,250, filed Apr. 26, 2017 and entitled "SIMPLIFIED CLOUD-BASED ENTERPRISE MOBILITY MANAGEMENT PROVISIONING," issued Mar. 24, 2020, as U.S. Pat. No. 10,601,675, which is hereby incorporated by reference in its entirety.

BACKGROUND

Enterprise mobility management ("EMM") systems have gained tremendous popularity. They generally enable employees to use their own personal computing devices for work purposes, allowing enterprises to save money by purchasing fewer dedicated computing devices. Enterprises also gain productivity by implementing an EMM system because employees can conveniently perform work tasks from their own devices. The users also enjoy the advantage of having fewer computing devices to keep track of.

The management features of EMM systems can prevent sensitive data from leaving work applications, which are often managed by the EMM system. An administrator can set restrictions on company data and even remotely wipe the device of sensitive information, for example, if an employee leaves the organization. EMM systems are also gaining popularity with educational institutions because of the ability to temporary block functionality, such as email or internet access, or lock the user into a particular managed application. Therefore, EMM providers are busier than ever before with provisioning EMM systems.

However, it is difficult and time consuming to set up an EMM system. When a customer comes to an EMM provider, it can take a month before the desired EMM system is deployed. While the customer waits, they tend to inquire about other EMM systems and generally fill the wait time with questions about the EMM system that is not yet operational. The additional questions further slow the deployment of the EMM system.

Many EMM systems are deployed as cloud computing solutions. The EMM system can, for example, operate in a cloud service, such as AMAZON WEB SERVICES or another cloud-based solution having one or more cloud servers. The EMM provider typically will manually set up one or more server instances for the EMM system. Each of these different servers can require its own manual setup. This means that a large EMM system with many servers involved can be very time consuming to initially install.

As the customer's workforce grows, more server instances may be needed. This can require further manual setup by the EMM provider. In the meantime, performance can suffer due to the overloaded EMM system. In some instances, the customer does not realize their system is overloaded and performance can slowly degrade before the EMM provider is notified of any issue.

As a result, a need exists for simplified cloud-based EMM provisioning.

SUMMARY

An example system for instantiating and scaling an EMM system can include a provisioning server that communicates with a cloud computing service. The provisioning server can include a portal that a user accesses with a computing device. The user can be a current or potential customer of an EMM provider. The portal can provide a graphical user interface ("GUI") that allows the user to specify how many computing devices they want their EMM system to support. The user can also specify which EMM application the EMM system should use. The EMM application will determine which management features are available in the system, such as device lock types and functionality, administrator console features, and managed application functionality. The GUI can further allow the user to specify locations where server instances will be installed. For example, the GUI can allow the user to provide a first address at a cloud server where a device services server will be instantiated, and a second address for a console server. The server instances can run as virtual machines in one example.

The provisioning server can run a script to determine how many server instances to stage at a cloud server. The determination can be based on the number of computing devices indicated by the user, or other user inputs. The script can determine how many of multiple types of server instances to use. For example, the server instances can include one or more device services servers, console servers, or application programming interface ("API") servers. The scripts can also determine how much computing power or storage space to allocate to the servers. The server instances can be virtual machines.

A device services server can communicate with computing devices in the EMM system. For example, messages and files can be exchanged between the computing devices and the device services servers. User devices also communicate with the device services server as part of enrollment in the EMM system. Console servers can be used by administrators to set compliance rules for user devices, assign software licenses, assign user devices to organization groups, manage repository access, and other management control functions. The console server can run the control portions of the EMM application. Administrative processes can originate at the console. The API server can allow the EMM system to communicate with other systems. For example, the provisioning server can send requests and commands to the API server and receive data in return. These can be WINDOWS servers in one example, but other operating systems are possible. In one example, a single server instance can perform the device services, console, and API functionalities.

The provisioning server can also identify the EMM installers needed for setting up the appropriate EMM software on the server instances. The provisioning server can determine the EMM installer to use based on the EMM application version indicated by the user. The provisioning server can send the EMM installer(s) to a cloud server that is part of the cloud computing service. The provisioning server can send a command to an API of the cloud service, causing the EMM installers to execute. The EMM installers can install a management application at a console server and device server, and can install a database that is used by the server instances.

A device server can interact with user devices that are managed by the customer's EMM system. This can include receiving requests from managed user devices and sending commands to the user devices. The device server can also enforce compliance rules at the user device. For example, the user device can report user actions to the device server, and the device server can determine if the user device complies with a set of compliance rules. If not, the device server can erase managed applications and managed data from the user device.

A console server can provide administrative capabilities to the EMM system. For example, an administrator console can provide an administrator a wide array of options for assigning privileges, compliance rules, applications, and other management features to the user devices that are enrolled in the EMM system. When an administrator selects to install an application on a user device or lock a user device, the console server can contact the user device and cause the user device to retrieve the application.

The console server can include an enrollment discovery component that can communicate with a user device during the initial stages of enrollment in the EMM system. The enrollment discovery component can be a process that executes on the console server. The console server or another server in the EMM system can provide the user device with an address, such as a uniform resource locator ("URL") of the enrollment discovery component. This can allow the user device to communicate with the console server to continue enrollment with the EMM system. The enrollment discovery component can also provide the user device with a token that can represent that the user device has been authenticated and that the user device is permitted to communicate and enroll with the EMM system.

The console server and user client device can communicate in order to complete enrollment with the EMM system. The user device can communicate with the console server after the user device has obtained a token from the enrollment discovery component. The console server can require that user device provide a token in order for the console server to proceed with the enrollment process. In other words, the console server may not proceed with enrolling the user device with the EN/IM system unless the console server provides the token generated by the enrollment discovery component. The console server can provide a console that facilitates administrators configuring and monitoring the status of the EMM system and the user devices enrolled with the EMM system.

Splitting the device and console servers can allow for high scalability. For example, multiple device servers and console servers can be instantiated in a single EMM system. Alternatively, the device server and console server can also be installed as parts of a single server.

As the server instantiation and EMM installation takes place, the provisioning server can provide a graphical user interface ("GUI") that allows the user to see the progress. For example, a status bar can indicate what stage of the overall provisioning process is in progress, which ones are complete, and which ones are still to come.

In one example, the provisioning server can instantiate more server instances over time. The script can, for example, instantiate one device server initially. But as the customer's EMM system begins to service more computing devices, the provisioning server can automatically instantiate additional device servers and console servers. In one example, an API server installed at the cloud service as part of the customer's EMM system communicates the number of computing devices to the provisioning server. The provisioning server can then determine if more or fewer servers are needed. If more are needed, then the provisioning server can instantiate additional servers at the cloud service. If fewer are needed, the provisioning server can decommission one or more instantiated servers. This can allow the customer's EMM system to automatically scale according to need.

It is to be understood that both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

In an example, a provisioning server can size and install an EMM system for a customer based on minimal customer inputs and human intervention. The provisioning server can include a portal that a user connects to with a user device. The provisioning server can provide a GUI with options that allow the user to specify the number of user devices that the customer's EMM system will manage. The user can also specify the EMM application version for use in the customer's EMM system, as well as deployment locations (also called deployment addresses) for a device services server and a console server. The deployment locations can be at a cloud service or can include the customer's servers. Then, the user can begin the deployment process by selecting a button.

The provisioning server can run a script to determine how many servers to instantiate at the deployment locations. Then the provisioning server can send a request to the cloud service to instantiate the servers. The request can be formatted according to an API of the cloud service, causing the cloud service to stage the requested servers.

The provisioning server can also determine one or more EMM installers based on the selected EMM application version. Those EMM installers can be loaded at the cloud service, where they install the necessary applications for the EMM system on the instantiated servers. The EMM installers can also install a database that is used by the instantiated servers. The provisioning server can report the progress of the server instantiation and EMM installation on a GUI screen that is accessible by the user. The GUI can indicate when setup is complete, and initial administrator passwords and other configuration details can be sent to the user.

Figure 1:
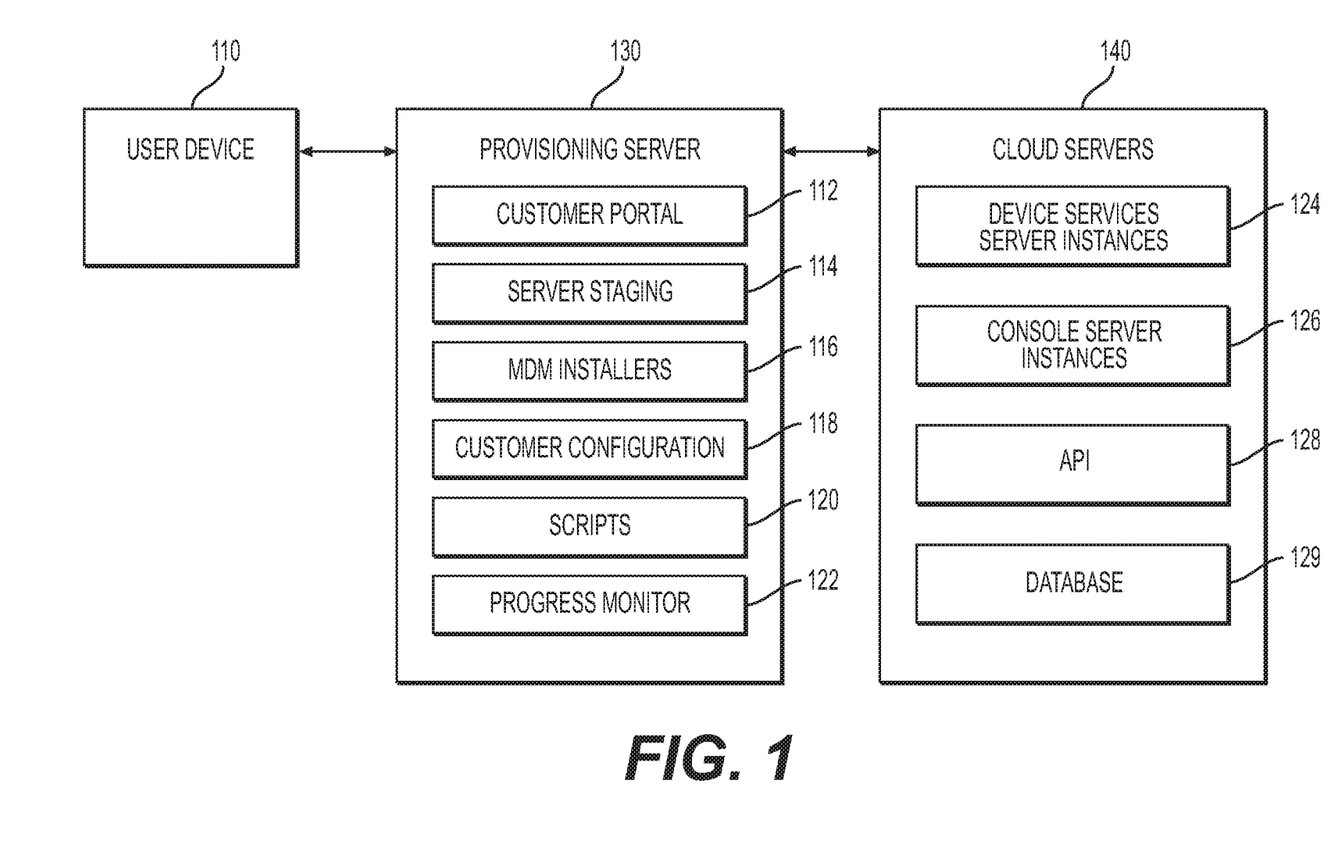
FIG. 1 is an exemplary illustration of system components.

FIG. 1 illustrates an exemplary system for simplified cloud-based EMM provisioning. A user device 110 can connect to a provisioning server 130 for purposes of setting up a new EMM deployment or scaling an existing deployment. The user can be a customer that is registered with the provisioning server 130, in an example. Alternatively, the user can be an administrator that uses the provisioning server 130 to deploy an EMM system on behalf of a customer. The user device 110 can be any computing device, such as a cell phone, laptop, tablet, personal computer, workstation, television, or television receiver. The user device 110 can include a non-transitory, computer-readable medium containing instructions that are executed by a processor. Example non-transitory, computer-readable mediums include RAM and ROM, disks, and other memory and storage that is accessible by a USB port, a floppy drive, CD-ROM or DVD-ROM drive, and a flash drive, among others. User devices 110 and provisioning server 130 can communicate wirelessly.

The provisioning server 130 can include a portal 112 to which the user device 110 connects. The portal 112 can be accessed over a network, such as the Internet, in one example. Alternatively, the portal 112 can be part of a closed network that is accessed by an administrator user.

Accessing the portal 112 can cause the user device 110 to display a GUI that is populated by the provisioning server 130. The GUI can allow the user to enter parameters that the provisioning server 130 uses in deploying and configuring the EMM system. For example, the GUI can allow the user to select a number of user devices 110 that the EMM system will manage. As an example, if an entire enterprise of 400 employees will be managed by the EMM system, the user could indicate in the GUI that 400 user devices 110 will be managed. The number can be part of a range that has a minimum and maximum number of user devices 110 anticipated in the EMM system, in one example.

If the EMM system already exists, the GUI can indicate how many active user devices 110 are managed by the EMM system. The user can then enter a new number to cause the provisioning server 130 to scale the number of servers accordingly.

The GUI can also allow the user to select a desired EMM version. This can determine the EMM application version that will run in the deployed the EMM system. Different versions can have different feature sets and can also cost different amounts.

In one example, the user can further indicate a deployment location where the server instances will be instantiated and execute. The deployment location can be a uniform resource locator ("URL"). The user can indicate multiple different deployment locations, in one example. The deployment locations can be at one or more cloud services 140, in an example. In one example, the provisioning server 130 can alternatively operate with a customer's server cluster. The customer's server cluster can also be a cloud service 140 relative to the provisioning server 130. One of more such locations can be indicated in the GUI.

A cloud service 140 can be made up of multiple cloud servers 140. As used herein, the term "cloud server" can apply to one or more servers that are part of the cloud service 140. One common cloud service is AMAZON WEB SERVICES. The customer might have its own cloud service 140 in an example. Alternatively, the EMM provider might have its own cloud service 140 for hosting customer EMM systems.

The provisioning server 130 can include scripts 120 for EMM instance staging 114. The scripts 120 can use the user's GUI inputs and other criteria to determine which types of servers 124, 126, 128 to instantiate in the cloud service 140. The scripts 120 can compare the number of managed user devices 110 against a series of thresholds to determine how many server instances 124, 126, 128 of each server type are needed. The thresholds can change based on which EMM version the customer will execute. This is because different versions can place different demand loads on the servers 124, 126, 128.

Similarly, a customer's configuration file 118 can change the thresholds. The customer configuration file 118 can indicate computing devices to enroll, applications to install, and other preliminary information regarding the EMM system.

In one example, the scripts 120 calculate a deployment schedule that slowly incorporates more servers 124, 126, 128 over time based on an anticipated adoption of the EMM system. For example, a newly-implemented EMM system might not receive enrollment from all employee user devices 110 at the outset, but would experience increasing loads over time.

Enrollment can be a process by which user devices 110 are configured for management with the EMM system. A user can opt to enroll their user device 110, in an example. During enrollment, management software, such as a management component can be installed on the user device 110 from the EMM system (e.g., from the console server 126). The management component can allow the EMM system to control certain aspects of the user device 110, such as functionality related to managed applications and enterprise data. The console server 126 can communicate with the management component, causing the operating system of the user device 110 or a managed application on the user device 110 to turn on or off particular functionality.

As part of enrollment, a server 124, 126 of the MDM system can provide the user device 110 with a token that can represent that the user device 110 has been authenticated and that the user device 110 is permitted to communicate and enroll with the EMM system. In one example, the console server 126 and user device 110 can communicate in order to complete enrollment with the EMM system. The user device 110 can communicate with the console server 126 after the user device has obtained a token from the EMM system. The console server 126 can require that user device 110 provide a token in order for the console server 126 to proceed with the enrollment process. In other words, the console server 126 may not proceed with enrolling the user device with the EMM system unless the console server provides the token generated by the enrollment discovery component. The console server 126 can provide a console that facilitates administrators configuring and monitoring the status of the EMM system and the user devices 110 enrolled with the EMM system.

The provisioning server 130 can perform the EMM server staging by sending one or more recognized commands to the cloud service 140. The cloud service 140 can instantiate, stage, and execute all the servers 124, 126, 128 and databases 129 necessary to operate the customer's EMM system. Multiple server types can contribute to the EMM system's overall functionality.

The servers can include a device services server 124 and a console server 126. These can be deployed at the same or different locations, depending on user selections. A device services server 124 can interact with user devices 110 that are managed by the customer's EMM system. This can include receiving requests from managed user devices 110 and sending commands to the user devices 110. A console server 126 can provide administrative capabilities to the EMM system. For example, an administrator console can provide an administrator a wide array of options for assigning privileges, compliance rules, applications, and other management features to the user devices that are enrolled in the EMM system. These features are elaborated on below.

The EMM system can also include an API server 128, in an example. The API server 128 can allow other systems to interact with the EMM system. In one example, the provisioning server 130 can interact with the customer's EMM system by contacting the API server 128. The API server 128 can have an interface for receiving commands from other servers or computing devices that are not otherwise part of the EMM system. For example, the provisioning server 130 can request the number of managed user devices from the API server 130 in an example. Alternatively, a command to the API server 128 can allow the provisioning server 130 to decommission one or more servers 124 or 126. The API server 128 can also allow the EMM system to tie in with third party cloud storage providers, among others.

The cloud service 140 can also store a database 129 that is used by the server instances 124, 126, 128 of the EMM system. The database 129 can be one or multiple repositories that store any type of information used by the EMM system. For example, the databases 129 can include file repositories for managed documents, profile or configuration information for managed user devices, applications for download and install on user devices, and other information.

One or more EMM installers 116 can install the necessary functionality on the instantiated servers 124, 126, 128. The provisioning server 130 can select the applicable EMM installers 116 based on which EMM application version the user selected. In one example, separate EMM installers 116 can be provided for each of the server types, such as device services 124 and console 126. A separate EMM installer 116 can set up a database for the EMM system. Alternatively, a single EMM installer 116 can install the correct applications and data on multiple server instances of the EMM system.

The provisioning server 130 can then load the selected EMM installers 116 onto the cloud service 140 if they do not already exist there. The provisioning server 130 then sends a command to the cloud service 140 to cause the EMM installers 116 to execute.

The EMM installers 116 can utilize a configuration file 118 to guide installation. The configuration file 118 can contain the custom deployment locations provided by the user. The configuration file 118 can also indicate various modules for installation with the EMM system on the server instances 124, 126. The EMM installer 116 can install the core EMM management software on the server instances 124, 126. It can also install the database 129 for use by the servers 124, 126.

The provisioning server 130 can include progress monitoring 122 that updates a GUI screen, allowing the user to see the progress of the server instantiation and EMM install. As tasks finish in the cloud service 140, the provisioning server 130 can update the GUI, in an example.

After the servers are instantiated and the EMM applications are installed, the provisioning server 130 can send a user name and password to the user or an administrator user for the customer. Upon logging in, the EMM system is ready for use in one example. An administrator can use a console to control aspects of enrolled user device 110 operation. The console functionality can be provided by a console server instance 126. Using the console, the administrator can set various management options for application at the enrolled user devices 110.

Managed applications can be specified for the enrolled user devices 110, ensuring that employees have access to the applications needed for their jobs. The database 129 can track which user devices 110 receive which applications. The applications can be downloaded from a device server 124 to the enrolled user devices. In one example, the device server 124 sends a message to the user devices 110 regarding the download. A management agent on the user devices 110 can cause the user devices 110 to respond by contacting the device server instance 124 to download and install the applications.

The EMM system can install a management agent on the enrolled user devices 110. The device server instance 124 can interact with the management agent to control functionality of the managed applications on the user devices. Managed applications can cause the user devices to communicate over a network with the device server instance 124 to securely access files and receive management-related instructions. For example, the device server instance 124 can lock the user device 110 into a managed application and determine what functionality or files are accessible within the applications. These controls can be based on settings performed at the console server instance 126 and stored in the database 129.

The management agent can be a portion of an operating system for the user device 110, or it can operate in the application layer of the user device 110. The management agent can include a device-level component. Device-level components can include an API, agent application, hypervisor, or virtualized device. The management agent can also include an application-level component. The application-level component can include an API, SDK, application wrapper, or workspace agent application. The device-level management agent can include system level privileges. The application-level management agent can include privileges in managed applications, which can be developed for operation with the device server instance 124. Reference to the management agent is understood to include either or both of the device-level and application-level components unless otherwise specified.

The device server instance 124 or API server 128 can interact with the management agent with application-level calls to the application or device-level calls to the operating system of the user device. In one example, based on a permissions control for a portion of a presentation or slides file, the customer's EMM system can turn functionality on and off within the managed applications through calling subroutines in the management agent. If a permission control specifies it, the customer's EMM system can turn off functionality at the user device, such as printing, emailing, or Internet access. This can allow for added security when viewing or editing particularly sensitive portions of a presentation or slides file.

The customer's EMM system can utilize the management agent to install, disable, or uninstall the managed applications. The customer's EMM system can automatically disable, delete, or uninstall user data including applications at the user device 110 if a compliance breach is detected. This can help prevent security breaches and unauthorized document access. Alternatively, if the user device 110 was used by an employee that leaves the enterprise, the customer's EMM system can cause the user device 110 to remove user data and remotely lock the user device 110. In one example, the management agent ensures that the user device 110 is in compliance with compliance rules set at the console server instance 126. If the user device 110 is not in compliance, the management agent can cause the user device 110 to lock certain functionality or wipe user data.

The database 129 can track which rules apply to which user devices 110. Compliance rules can be assigned differently to the different user groups. For example, an executive group can be assigned different compliance rules than a receptionist group. The executive group might be allowed to install different applications than the receptionist group.

In one example, the customer's EMM system can configure a user device 110 with different functionality based on applicable user groups. User groups can define groups of users, or groups of user devices 110, that are intended to receive a particular feature set. A user group can be defined using any relevant criteria, including a type of user, a type of device, a location of the device, or a school associated with the device, for example. A user device 110 can belong to any number of functional user groups. For example, a user device 110 can belong to a user group associated with engineers, as well as a user group associated with a particular project. The project group could be used to provide special access to a project-specific repository, which can be located in database 129 or elsewhere. The engineer user group could also provide access to special applications needed by the engineers to limit licenses to only those employees who need access to the specialized applications.

In addition to initial deployment, the provisioning server 130 can continue to scale the EMM system up or down at the cloud service 140. In one example, the provisioning server 130 receives usage data from the API server 128. If data shows a trend in either direction, the provisioning server 130 can take action, either decommissioning servers 124, 126 or instantiating additional servers 124, 126 at the cloud service 130.

The provisioning server 130 can include one or more servers. Each server can include one or more processors that execute instructions stored on a non-transitory, computer-readable medium. The provisioning server 130 can include any number of servers and processors.

The user device 110, provisioning server 130, and cloud servers 140 can each utilize one or more processors. The term "processor," as generally used herein, can refer to any logic processing unit, such as one or more central processing units ("CPUs"), digital signal processors ("DSPs"), application specific integrated circuits ("ASICs"), field programmable gate arrays ("FPGAs"), and similar devices. The processor can include one or more processors configured to execute instructions and process data to perform one or more functions associated with system 100. The processor can be communicatively coupled to a RAM, ROM, storage, database, I/O module, or interface module. A processor can be configured to execute sequences of computer program instructions to perform various processes, which will be described in detail below. The computer program instructions can be loaded into RAM for execution by the processor.

Although the above examples are described with regard to a customer's EMM system, they also can apply to the EMM provider's own EMM system. For example, the provider can log into the provisioning server 130 and deploy servers for an EMM system that it hosts for itself or for a customer.

Figure 2A:
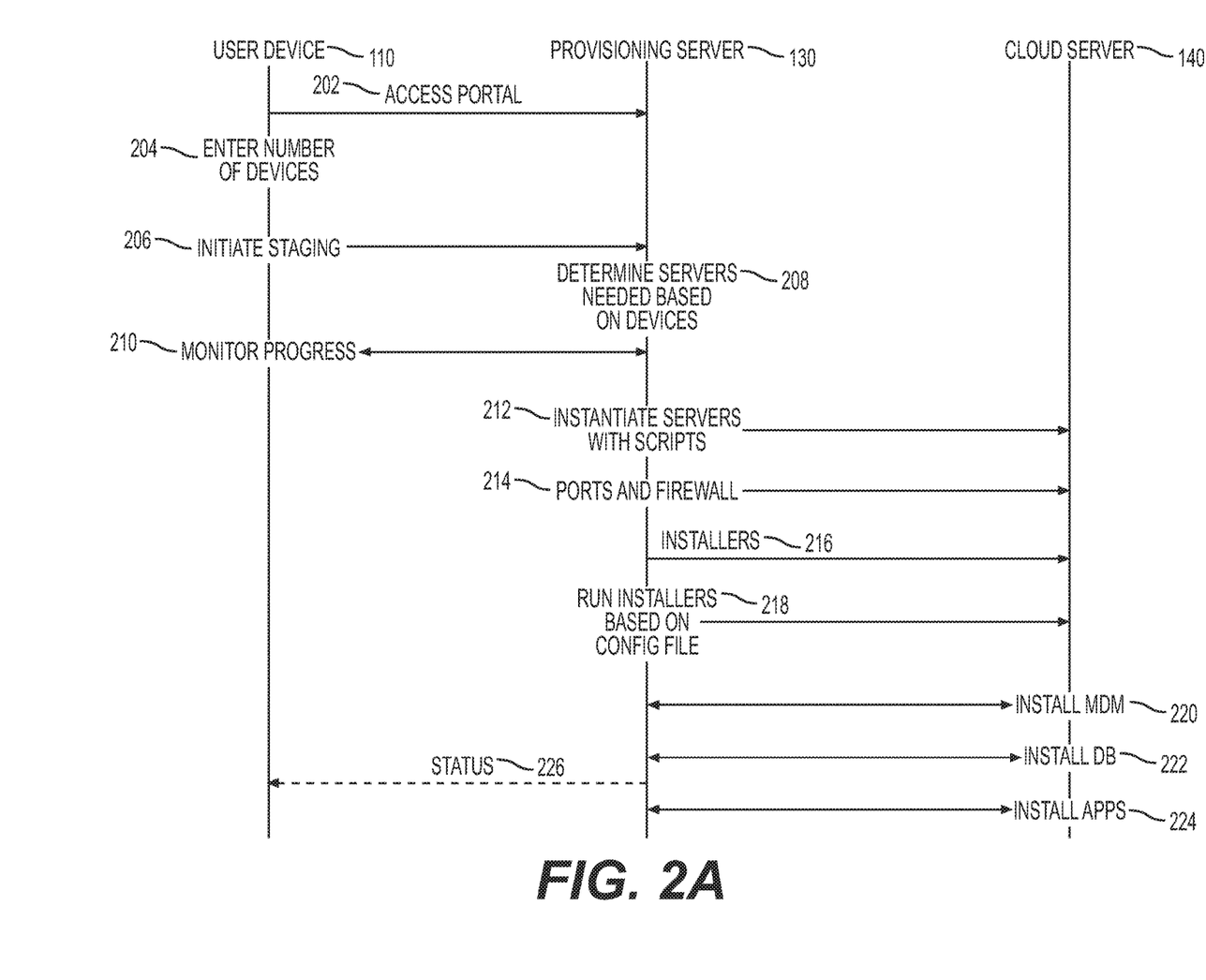
FIG. 2A is an exemplary flow chart of steps performed in a system.

FIG. 2A is an exemplary flow chart of stages performed in a system. At stage 202, user device 110 logs into the provisioning server 130. A user can do this using their user device 110, in an example. The provisioning server 130 can be accessible over a network using an Internet browser in one example. Alternatively, an application executing on the user device 110 can communicate with the provision server 130 and display a GUI on the user device 110. In one example, the user can log in or create an account so that the provisioning server 130 can associate the user with a tenant, such as a customer or division or of a customer.

The user can select an option to provision an EMM system. For example, the user can click a button to begin the process. In response, a screen can display a request for basic information about the EMM system.

At stage 204, the user can enter the number of user devices 110 that will be managed by the EMM system. This can be a single number, or multiple numbers forming a range. Alternatively, a slider or other graphical option can allow the user to approximate a number of computing devices. In one example, the number based on a slider does not visually display to the user, but is instead supplied by the code of the provisioning server 130 or script 120.

At stage 208, the provisioning server 130 can determine how many servers to instantiate at the cloud service 140. One or more scripts 120 can execute to help the provisioning server 130 make this determination. In an example, a script 120 can compare the number of user devices 110 against thresholds that determine how many server instances are needed. The thresholds can specify different numbers of device services servers 124 and console servers 126 based on the number of user devices 110. The script 120 can also determine the size of the one or more servers based on the number of user devices 110. The script 120 can also use the EMM application version to adjust the number or sizes of servers 124, 126, based on the computing loads of that EMM application. The EMM application version can also dictate a particular API server 128, which can allow outside systems to interact with certain functionality of the EMM system.

At stage 212, the provisioning server 130 can instantiate the servers 124, 126 at the cloud server 140. To do this, the provisioning server 130 can make API calls to the cloud server 140. The API calls can cause the cloud server 140 to execute new virtual machines, which can persist as new server 124, 126 instances. These virtual machines can be configured based on the configuration file 118, in one example. This can include copying files to the virtual machine, changing settings on the virtual machine, and installing applications on the virtual machine. The instantiated server can, therefore, be a virtual machine that is configured to execute as a server 124, 126.

The servers 124, 126 can be deployed at the deployment locations selected by the user. The deployment locations can be supplied to a network load balancer for the cloud server 140 so that traffic can be correctly routed This can include running a WINDOWS installer to provide an operating system for the servers, in an example. The instantiation can stage the servers 124, 126 such that they are ready to receive EMM applications and data.

In one example, the provisioning server 130 instantiates the servers 124, 126 in stages over a range of dates. For example, based on a projected adoption rate, a minimal number of servers 124, 126 can be instantiated initially. The provisioning server 130 can schedule events to cause additional server instantiation and setup at future dates. In one example, the provisioning server 130 can request usage details from the instated servers 124, 126, 128 to determine the appropriate number of servers to instantiate at the future dates.

At stage 214, the provisioning server 130 can configure ports and firewalls at the instantiated servers 124, 126. The configurations can be based on the EMM application version that will be installed. The EMM applications can have particular port and firewall requirements that allow the management functions to operate correctly. For example, communication port 443 can be used for Internet traffic. The provisioning server 130 can configure port number 443 to accept secure traffic. This can include enabling the secure traffic type on port number 443. Alternatively, the configuration file 118 for can specify unique port settings for a particular client. A series of ports can be enabled for particular traffic types or routed to other ports based on the configuration settings in the configuration file 118.

Additionally, installation of the EMM applications and data might require the servers to open particular ports and provide access to the provisioning server 130 or EMM installers 116 through the firewall. The port and firewall settings are stored in a configuration file associated with the EMM application version in one example.

In one example, to set the ports and firewalls, the provisioning server 130 can access an API of the cloud service 140. This can include providing credentials identifying the provisioning server 130. If a user specifies a deployment location at a server where the provisioning server 130 is not credentialed, the user can be prompted to supply the credentials to the provisioning server 130. For example, a software as a service ("SAAS") cloud service 140 can require a user name and login. This information can be supplied to the provisioning server 130, which then supplies the login information to the cloud service 140.

Similarly, the provisioning server 130 can require an API key to communicate with particular cloud servers 140. The API key can map commands of the provision server 130 to API commands of the cloud service 140. This can ensure that the provisioning server 130 can properly interact with the cloud service 140 and monitor the loading of new servers and the install process. In one example, the GUI only lets the user select deployment locations at servers for which the provisioning server 130 has an API key. In another example, the GUI allows the user to upload an API key in connection with a deployment.

At stage 216, the provisioning server 130 can load the EMM installers 116 on the cloud service 140. The EMM installers 116 can be loaded by API command in one example. Then, the provisioning server 130 can communicate with the cloud service 140 to execute the EMM installers 116 at stage 218. In one example, WINDOWS remoting software is used to execute the installers.

The EMM installers 116 can utilize one or more configuration files 118 to guide the installation. The configuration files can include deployment locations of the server instances, can identify various parts or modules of the EMM application for installation at the various servers, and contain initial data to load into the EMM system.

The EMM installers 116 can install the EMM application across the instantiated servers 124, 126 at stage 220. The functionality can relate to command queuing and processing, console functionality, enrollment of user devices, and all other parts of an EMM system.

At stage 222, the EMM installers 116 can install a database 129. The database 129 can store user profiles, user groups, configuration rules, and other information needed to set and enforce EMM policies. At stage 224, the database 129 can also store managed applications that are distributed to the enrolled user devices 110. The applications can be identified in the configuration file 118, in an example. Alternatively, the customer can be provided with selection options for choosing packages of software and numbers of licenses.

While the provisioning server 130 and cloud services 140 stages are taking place, the user device 110 can monitor progress at stage 210. The GUI can continuously update status at stage 226, as servers are instantiated, ports and firewalls are set, installers are executed, and installations complete. This process can take a matter of hours, saving weeks of installation time compared to conventional methods.

Figure 2B:
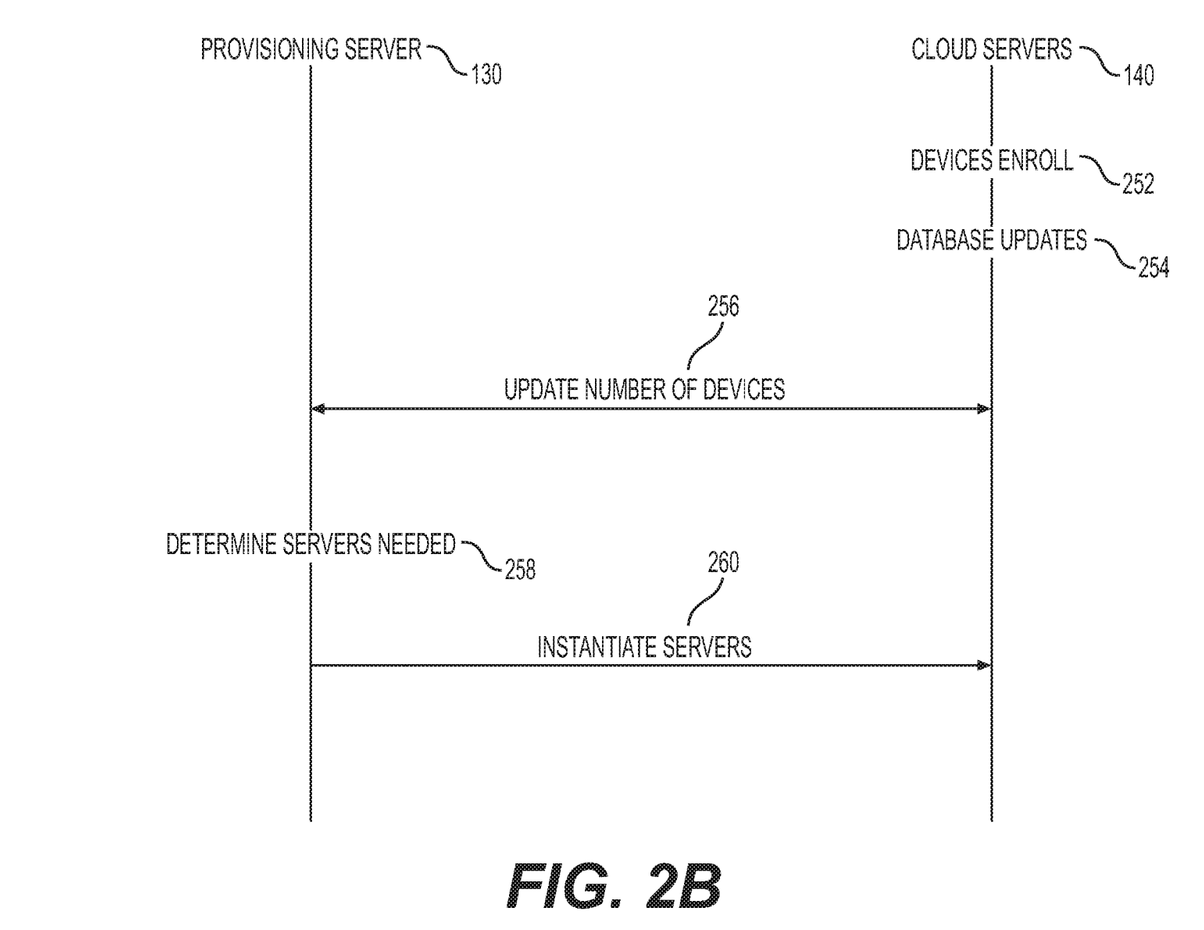
FIG. 2B is an exemplary flow chart of steps performed in a system.

FIG. 2B is an exemplary flow chart of stages performed in a system. The stages in FIG. 2B can relate to scaling the EMM system based on usage or anticipated usage. The scaling can be automatic in one example. In one example, at stage 252, user devices 110 enroll in the EMM system at the cloud service 140. This can happen on a rolling basis. For example, as new employees join the enterprise or acquire new computing devices, the number of enrolled user devices 110 can increase. This information can be tracked in a database at stage 254.

In one example, at stage 256, the EMM system in the cloud service 140 communicates an updated number of devices to the provisioning server 130. The console settings of the EMM system can cause the EMM system to report to the provisioning server 130 once device usage has exceeded a threshold number of user devices 110. The EMM system can also be set at the console to report when device usage falls below a threshold. This can indicate that the EMM system does not need all of the instantiated servers, and decommissioning a number of them could save the enterprise money.

In another example, the provisioning server 130 can request information from the database 129 to determine whether scaling is needed. The database 129 can track information, such as number of users, used by the provisioning server 130 to determine whether to instantiate or decommission a server. In one example, the database 129 can be accessed directly by the provisioning server 130, which can have credentials accepted by the database 129. In another example, the provisioning server 130 can send a request to the API server 128. The API server 128 can then run a stored procedure at the database 129 or retrieve the requested information from another part of the EMM system. The information can indicate whether additional servers should be instantiated or if existing servers should be decommissioned. This can simply be a message based on comparisons made by the console server 126 in one example. Alternatively, the indication can include an updated number of devices that the provisioning server 130 can use to make its own commissioning and decommissioning decisions.

At stage 258, the provisioning server 130 can determine whether to instantiate additional servers. To do so, the provisioning server 130 can execute one or more scripts 120 based on the updated number of devices. The scripts 120 can operate as described with regard to stage 208 of FIG. 2A. If the scripts 120 indicate that more or fewer servers are required than currently instantiated, the provisioning server 130 can adjust the number of servers at stage 260. If more servers are required, the provisioning server 130 can repeat stages 212 through 224 of FIG. 2A. If fewer servers are required by a threshold margin, the provisioning server 130 can decommission one or more servers 124, 126. The provisioning server's 130 permission to decommission can be set at the console server 126 in one example. To decommission a server, the provisioning server 130 can issue a command through the API of the cloud service 140, in an example.

Figure 3:
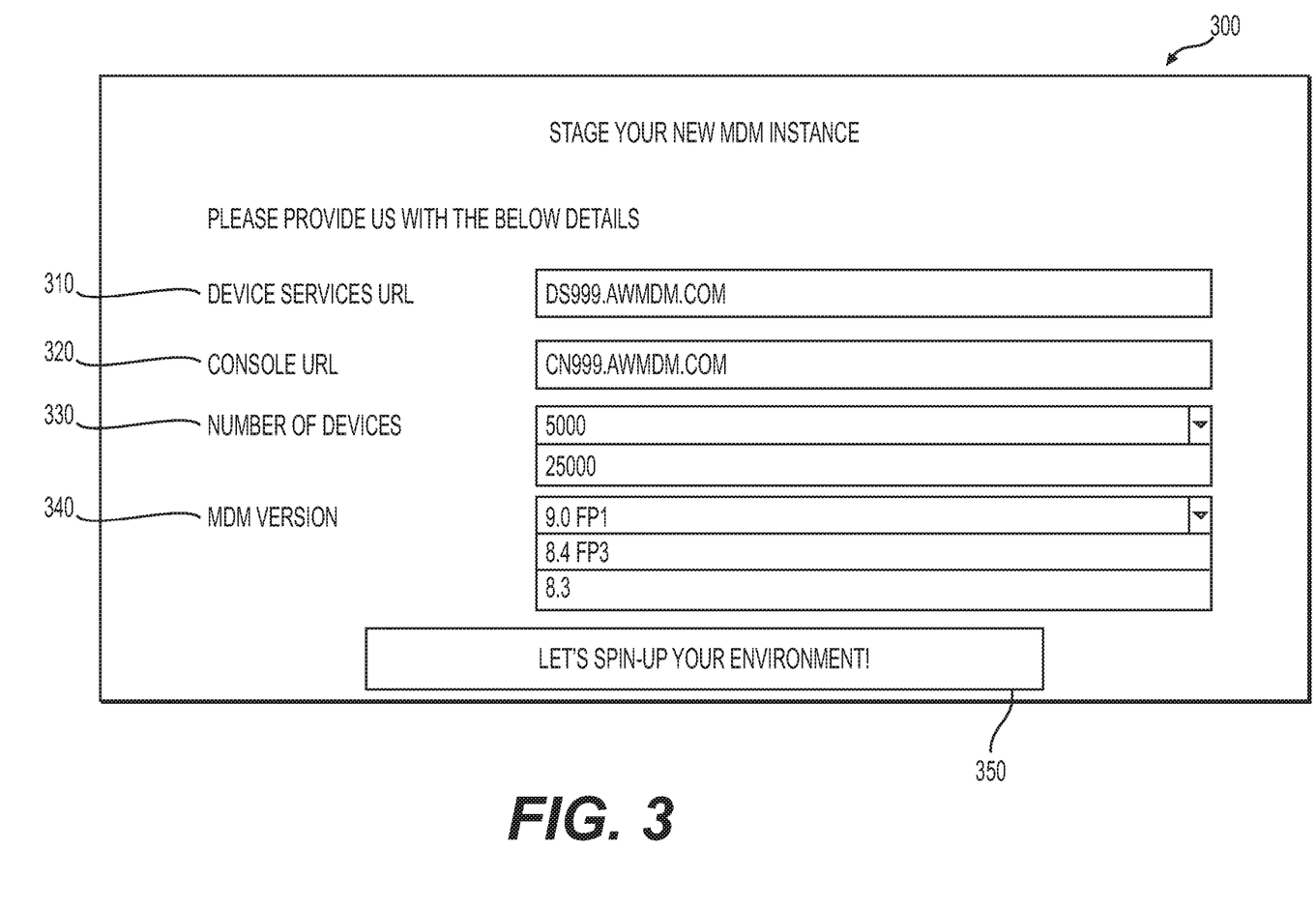
FIG. 3 is an exemplary illustration of a graphical user interface.

FIG. 3 is an exemplary illustration of a GUI screen 300 that allows a user to begin simplified EMM provisioning. The screen 300 can display after the user has logged into the provisioning server 130 portal 112 in one example. In this example, location fields 310 and 320 allow the user to specify where the device services 124 and console 126 servers will be installed. The location fields 310 and 320 can accept URLs that indicate locations within the cloud service 140.

A "number of devices" input 330 (referred to herein as "devices input 330") can allow the user to indicate how many user devices 110 the EMM system should support. In one example, the devices input 330 is a drop-down list with options that correlate to different numbers of servers 124, 126. Alternatively, a text field can allow the user to type a custom number. In still another example, the user can type or select a minimum number and a maximum number. The provisioning server 130 can use the minimum number of user devices to determine an initial number of servers to instantiate. The maximum number can be by the provisioning server 130 to automatically instantiate additional servers up to a maximum based on increased demand at the EMM system.

An EMM selection option 340 can allow the user to select which EMM application version the EMM system will use. This can be a drop-down list with different options. In one example, the provisioning server 130 can provide information to the user to help the user differentiate between the different EMM application versions.

A button 350 can allow the user to start the provisioning of the EMM system. When the button 350 is pressed, the provisioning server can determine the number of servers, instantiate them, load EMM installers, and install the EMM applications as described.

Figure 4:
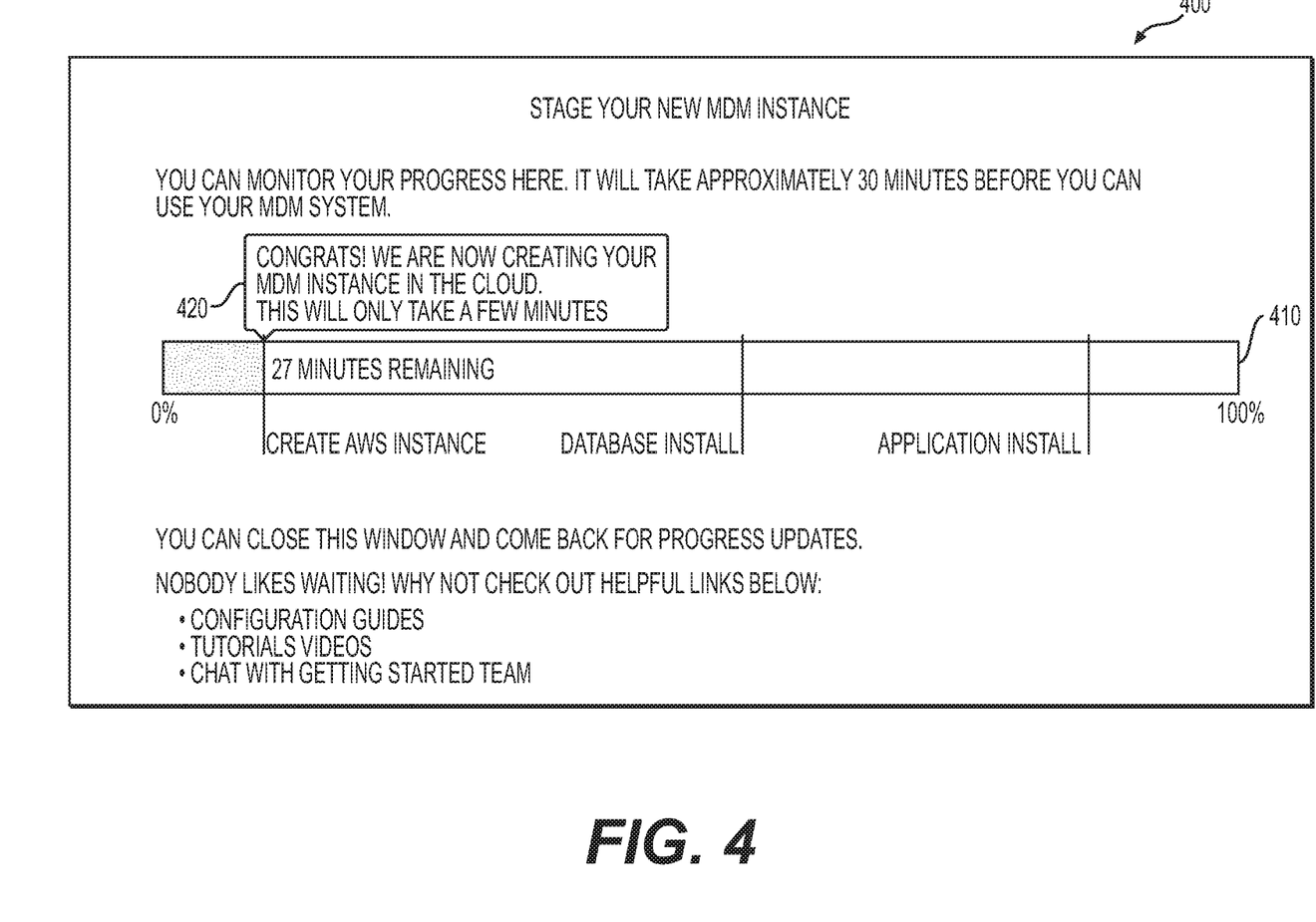
FIG. 4 is an exemplary illustration of a graphical user interface.

FIG. 4 is an exemplary illustration of a GUI progress monitor screen 400. This screen 400 can help the user understand the progress of the EMM provisioning in real time. A progress meter 410 can update as the provisioning stages complete. A message box 420 can update the user regarding specific actions that are taking place between the provisioning server 130 and cloud service 140. In this example, the message box 420 indicates that the servers are being instantiated. After that, the database will install and applications will install.

Figure 5:
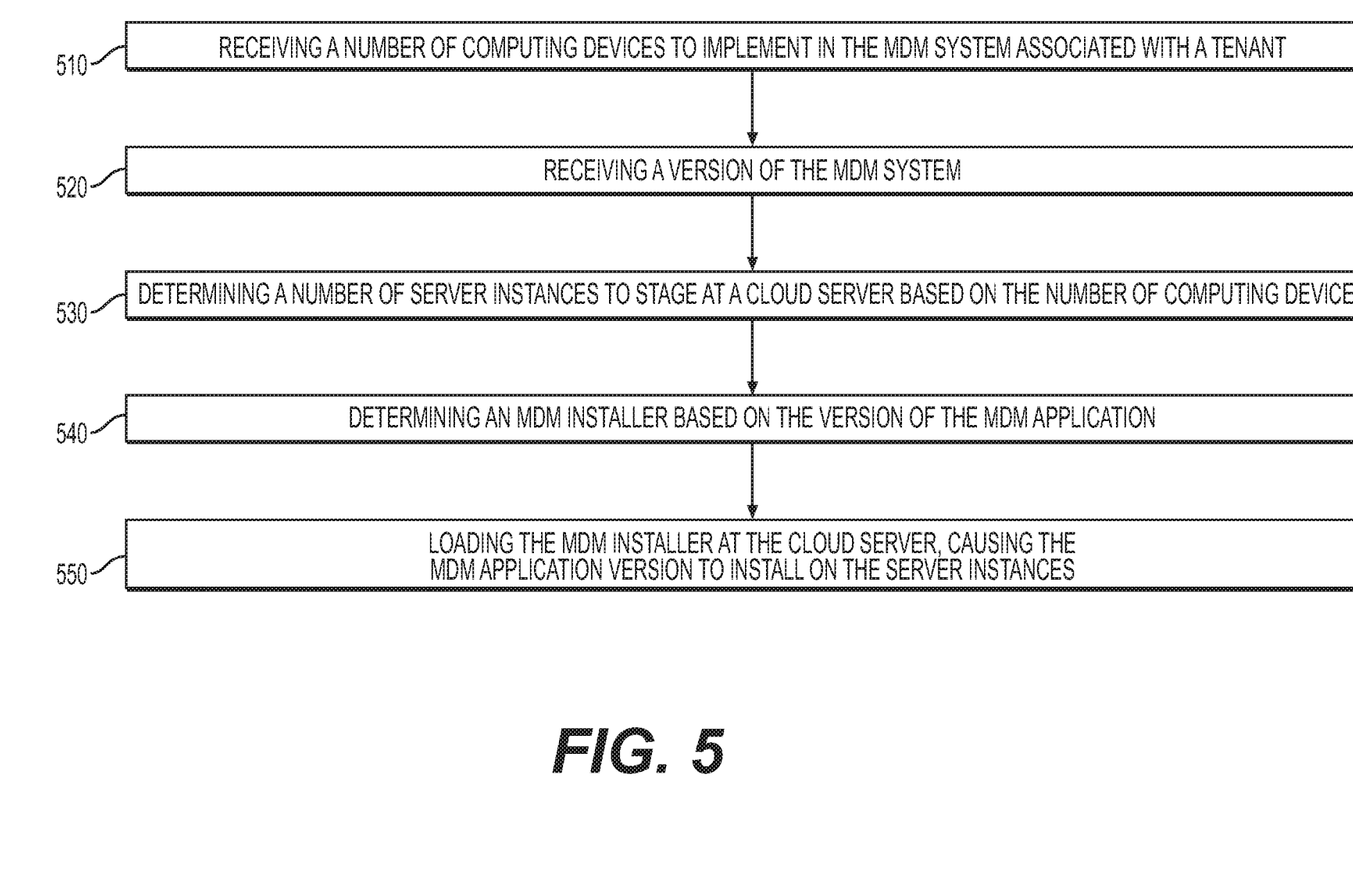
FIG. 5 is an exemplary flow chart of steps performed in a system.

FIG. 5 is an exemplary flow chart of steps performed in a system. At stage 510, the provisioning server 130 can receive an indication of a number of computing devices to implement in the EMM system. The EMM system can be associated with a tenant, such as a customer or division or group within a customer. The number of computing devices can be based on the number of users expected to use the system. The user can input the number of computing devices in a portal GUI for the provisioning server 130.

Alternatively, an existing EMM system can report the number of computing devices at stage 510. For example, the console server 126 can allow an administrator to set the system to report to the provisioning server 130 so the provisioning server 130 can better anticipate demand. In another example, the provisioning server 130 can periodically check with the API server 128 of the EMM system to determine whether more or fewer servers are needed. The API server 128 can receive a request from the provisioning server 130, check the database 129 for statistics, and report back to the provisioning server 130. In still another example, the API server 128 or database 129 periodically reports to the provisioning server 130 or some other server with usage statistics. By storing and checking these statistics, the provisioning server 130 can determine when scaling is necessary.

At stage 520, the provisioning server 130 can receive a version of the EMM system. The user can select the version from a drop-down box of choices. The version can dictate which features are available in the EMM system. Different versions can also have different compatibilities with particular cloud services 140. In one example, the provisioning server 130 can provide information to the user to help the user differentiate between the different EMM application versions and select the appropriate version.

At stage 530, the provisioning server 130 can determine the number of servers to instantiate at the cloud service 140. Scripts 120 can analyze a variety of factors, including the number of user devices, to determine the number of servers to instantiate. In one example, a user can specify a monthly maximum price. The scripts 120 can ensure that the number and size of servers stay within the monetary threshold at the cloud service 140. The scripts can also change the number of servers based on the EMM application version. Some versions can have scalability limits, including maximums or minimums.

The provisioning server 130 can instantiate the servers by interacting with the API of the cloud service 140, in an example. This can cause virtual machines to execute on the cloud service 140. Each server instance can have its own virtual machine in an example. Alternatively, multiple servers can be set up on a single virtual machine.

At stage 540, the provisioning server 130 can determine an EMM installer 116 needed for setting up the appropriate EMM software, based on the version of the EMM application selected at stage 520. A table accessible to the provisioning server 130 can map the EMM version to the appropriate EMM installers 116. The provisioning server 130 can access the table, look up the selected version of the EMM application, and identify the appropriate EMM installer 116 to be utilized.

At stage 550, the provisioning server 130 can load the EMM installer 116 on the cloud server 140. The cloud server 140 can have an FTP server in one example. The provisioning server 130 can cause the EMM installer 116 to execute, such as by sending a command to the cloud server 140. In one example, the EMM installers 116 can install software that runs the EMM system on a console server 126 in a virtual machine on the cloud service 140. The installation can be based on a configuration file 118 that includes customer-specific information in an example. The provisioning server 130 can also send managed applications to the cloud service 140 for deployment to user devices that enroll in the EMM system.

Other examples of the disclosure will be apparent to those skilled in the art from consideration of the specification and practice of the examples disclosed herein. The examples are not limited to an enterprise environment, and may be applied at educational facilities or other environments. As used herein, a "customer" can be an active or prospective customer. The term is not meant to limit user types or be construed in a contractual sense.

Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for dynamically provisioning an enterprise mobility management ("EMM") system at a cloud service, comprising:
   instantiating, by a provisioning server remote from the cloud service, at least one console server and at least one device server at the cloud service;
   loading an EMM installer at the cloud service, the EMM installer configured to install a database in the cloud service and install an EMM application in at least one instantiated server;

receiving, at the provisioning server, an update from the database providing a current number of computing devices enrolled in the EMM system; and automatically increasing or decreasing a number of instantiated servers in the EMM system in an instance in which the provisioning server determines that the current number of computing devices satisfies a condition.

2. The method of claim 1, wherein the condition is a threshold number of computing devices enrolled in the EMM system.

3. The method of claim 1, wherein the provisioning server loads the EMM installer based on the EMM installer corresponding to a version of the EMM application.

4. The method of claim 1, wherein the provisioning server loads the EMM application based on the EMM application corresponding to a version of the EMM installer.

5. The method of claim 1, wherein the at least one console server executes an administrator interface allowing an administrator to manage the EMM system.

6. The method of claim 1, wherein the at least one device server communicates with a plurality of computing devices enrolled in the EMM system.

7. The method of claim 1, wherein automatically increasing or decreasing the number of instantiated servers comprises automatically increasing or decreasing the number of console servers or device servers, or both.

8. A non-transitory, computer-readable medium containing instructions executed by at least one processor to perform stages for provisioning an enterprise mobility management ("EMM") system, the stages comprising:

instantiating, by a provisioning server remote from the cloud service, at least one console server and at least one device server at the cloud service;

loading an EMM installer at the cloud service, the EMM installer configured to install a database in the cloud service and install an EMM application in at least one instantiated server;

receiving, at the provisioning server, an update from the database providing a current number of computing devices enrolled in the EMM system; and automatically increasing or decreasing a number of instantiated servers in the EMM system in an instance in which the provisioning server determines that the current number of computing devices satisfies a condition.

9. The non-transitory, computer-readable medium of claim 8, wherein the condition is a threshold number of computing devices enrolled in the EMM system.

10. The non-transitory, computer-readable medium of claim 8, wherein the provisioning server loads the EMM installer based on the EMM installer corresponding to a version of the EMM application.

11. The non-transitory, computer-readable medium of claim 8, wherein the provisioning server loads the EMM application based on the EMM application corresponding to a version of the EMM installer.

12. The non-transitory, computer-readable medium of claim 8, wherein the at least one console server executes an administrator interface allowing an administrator to manage the EMM system.

13. The non-transitory, computer-readable medium of claim 8, wherein the at least one device server communicates with a plurality of computing devices enrolled in the EMM system.

14. The non-transitory, computer-readable medium of claim 8, wherein automatically increasing or decreasing the number of instantiated servers comprises automatically increasing or decreasing the number of console servers or device servers, or both.

15. A system for provisioning an EMM system on a cloud server, comprising:

a non-transitory, computer-readable medium containing instructions;

a processor that executes the instructions to perform stages comprising:

instantiating, by a provisioning server remote from the cloud service, at least one console server and at least one device server at the cloud service;

loading an EMM installer at the cloud service, the EMM installer configured to install a database in the cloud service and install an EMM application in at least one instantiated server;

receiving, at the provisioning server, an update from the database providing a current number of computing devices enrolled in the EMM system; and automatically increasing or decreasing a number of instantiated servers in the EMM system in an instance in which the provisioning server determines that the current number of computing devices satisfies a condition.

16. The system of claim 15, wherein the condition is a threshold number of computing devices enrolled in the EMM system.

17. The system of claim 15, wherein the provisioning server loads the EMM installer based on the EMM installer corresponding to a version of the EMM application.

18. The system of claim 15, wherein the provisioning server loads the EMM application based on the EMM application corresponding to a version of the EMM installer.

19. The system of claim 15, wherein the at least one console server executes an administrator interface allowing an administrator to manage the EMM system.

20. The system of claim 15, wherein the at least one device server communicates with a plurality of computing devices enrolled in the EMM system.

* * * * *